United States Patent
Gurrala et al.

(10) Patent No.: US 12,438,560 B2
(45) Date of Patent: Oct. 7, 2025

(54) FILLER SYMBOLS FOR DATA BURSTS

(71) Applicant: Micron Technology, Inc., Boise, ID (US)

(72) Inventors: Praveen Gurrala, Boise, ID (US); Bryan D. Butler, Boise, ID (US); John Todd Elson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 27 days.

(21) Appl. No.: 18/393,309

(22) Filed: Dec. 21, 2023

(65) Prior Publication Data

US 2024/0243758 A1    Jul. 18, 2024

Related U.S. Application Data

(60) Provisional application No. 63/439,783, filed on Jan. 18, 2023.

(51) Int. Cl.
*H03M 13/29* (2006.01)
*H04L 25/03* (2006.01)

(52) U.S. Cl.
CPC .. *H03M 13/2906* (2013.01); *H04L 25/03057* (2013.01)

(58) Field of Classification Search
CPC ............... H03M 13/2906; H04L 25/03057
See application file for complete search history.

(56) References Cited

U.S. PATENT DOCUMENTS

| | | | |
|---|---|---|---|
| 2009/0006922 A1* | 1/2009 | Yoshida | G11B 20/1803 714/755 |
| 2016/0380797 A1* | 12/2016 | Rahman | H04L 27/2613 375/260 |
| 2023/0026005 A1* | 1/2023 | Kim | H04L 25/03885 |
| 2023/0086340 A1* | 3/2023 | Bendlin | H04W 16/14 370/329 |

\* cited by examiner

*Primary Examiner* — Janice N Tieu
(74) *Attorney, Agent, or Firm* — Holland & Hart LLP

(57) ABSTRACT

Methods, systems, and devices for filler symbols for data bursts are described. A memory device may insert filler symbols into a stream of data symbols. For example, after transmitting a last data symbol of a data burst, a device may insert one or more filler symbols to maintain an active data burst. The device may randomize the transmission of filler symbols within the data burst. In some cases, the device may randomly select filler symbols from a variety of symbol types, therefore randomizing which one of the symbols is transmitted. In some other cases, the device may randomize the representation of filler symbols within an encoding scheme.

20 Claims, 8 Drawing Sheets

| Layer | Layer Name | Functionality | Data Unit Name |
|---|---|---|---|
| LA | Application | Payload | Message |
| Layer 4 | Transport | Flow Control | Segment |
| Layer 3 | Network | Addressing | Packet |
| Layer 2 | Data Link | Frames | Frame |
| Layer 1.5 | PHY Adapter | Physical Layer Abstraction | UniPro Symbol |
| Layer 1 | PHY | Signaling, Clocking, Encoding | PHY Symbol |

FIG. 3

FILLER SYMBOLS FOR DATA BURSTS

CROSS REFERENCE

The present Application for Patent claims priority to U.S. Patent Application No. 63/439,783 by Gurrala et al., entitled "FILLER SYMBOLS FOR DATA BURSTS," filed Jan. 18, 2023, which is assigned to the assignee hereof, and which is expressly incorporated by reference herein.

TECHNICAL FIELD

The following relates to one or more systems for memory, including filler symbols for data bursts.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 3 illustrates an example of a layer diagram that supports filler symbols for data bursts in accordance with examples as disclosed herein.

DETAILED DESCRIPTION

Some devices (e.g., devices having transmission capabilities), may insert pseudo data symbols (e.g., filler symbols) into a stream of data symbols (e.g., a high-speed data burst) when data symbols are not available. For example, when there are no data symbols (or not enough data symbols) to send, a device may insert one or more filler symbols to maintain an active data burst for successive data symbols. However, successively inserting filler symbols may create signal periodicity, which may cause high electromagnetic emissions (e.g., emission peaks) at frequencies corresponding to the repetition rate of the periodicity. Such high electromagnetic emissions may result in electromagnetic interference (EMI) at a receiving device, which may be undesirable. Accordingly, a device configured to mitigate EMI during signal transmissions may be desirable.

A device configured to mitigate EMI during signal transmissions is described herein. For example, a device may mitigate EMI by randomizing the transmission of filler symbols. In some cases, the device may randomly select each filler symbol from a variety of symbol types, therefore randomizing which one of the symbols is transmitted. In some other cases, the device may randomize the representation of filler symbols when encoding aspects of a data burst. By selecting the degree of randomization (e.g., of the selected or encoded filler symbols), the device may control a trade-off between reducing emission peaks and reducing power consumption overhead. Further, these randomizing techniques may provide an alternative to a sleep state, which would otherwise cause the device to go out of sync when data symbols are not available for transmission.

Figure 1:
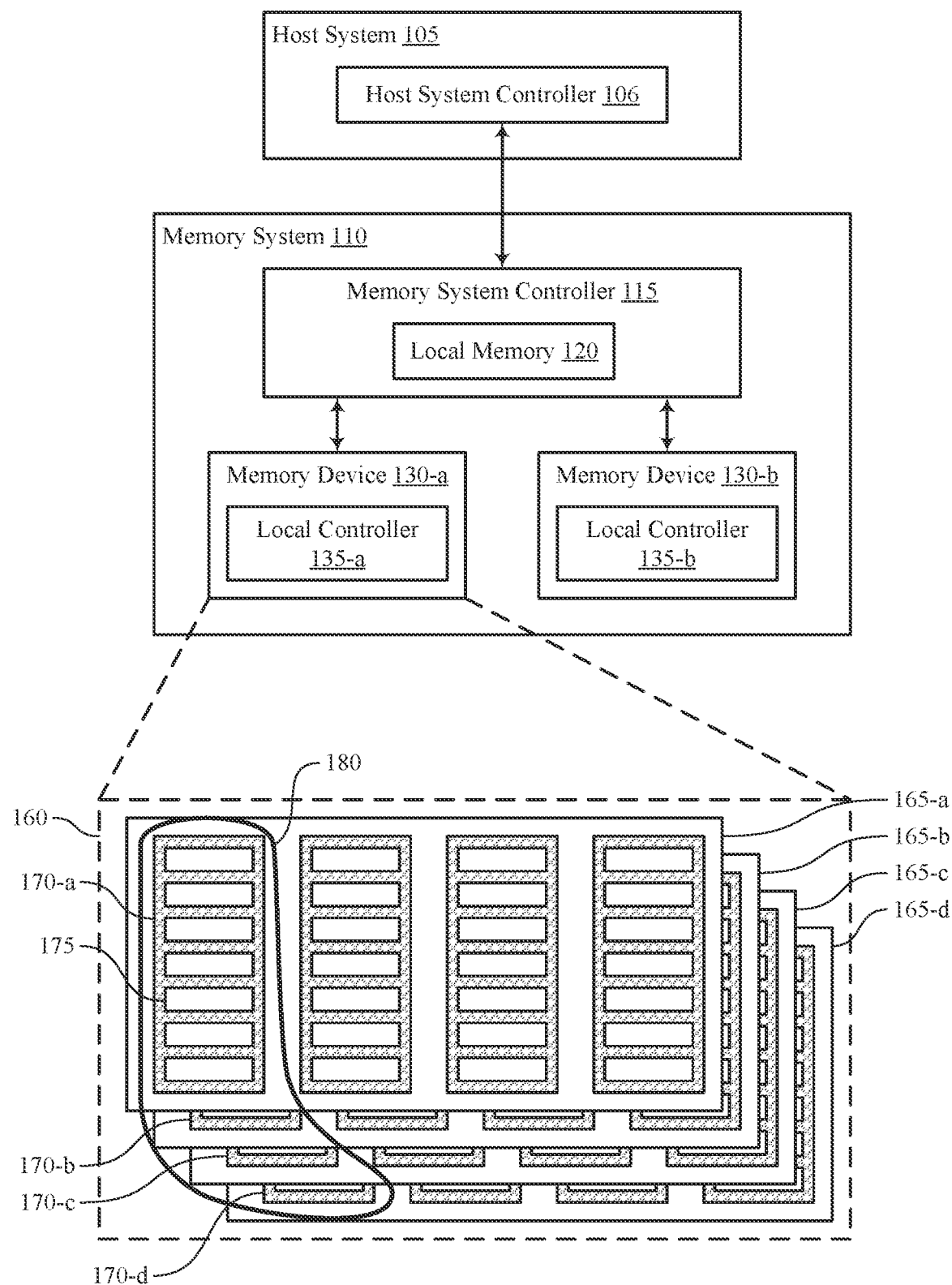
FIG. 1 illustrates an example of a system that supports filler symbols for data bursts in accordance with examples as disclosed herein.

Features of the disclosure are initially described in the context of systems, devices, and circuits with reference to FIG. 1. Features of the disclosure are described in the context of a system, a layer diagram, and a process flow, with reference to FIGS. 2 through 4. These and other features of the disclosure are further illustrated by and described in the context of block diagrams and flowcharts that relate to filler symbols for data bursts with reference to FIGS. 5 through 8.

FIG. 1 illustrates an example of a system 100 that supports filler symbols for data bursts in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support filler symbols for data bursts. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may insert filler symbols (or encode aspects of a data burst) as described herein. The memory system 110 may be a system that operates according to a standard (e.g., a UniPro standard) or may be an example of a Universal Flash Storage (UFS) device. In some cases, the memory system 110 may insert pseudo data symbols (e.g., filler symbols) into a stream of data symbols (e.g., a high-speed data burst) when data symbols are not available. For example, the memory system 110 may mitigate EMI by randomizing the transmission of filler symbols between the memory system controller 115 and a memory device 130.

In some cases, the memory system controller 115 may randomly select each filler symbol from a variety of symbol types, therefore randomizing which one of the symbols is transmitted. In some other cases, the memory system controller 115 may randomize the representation of filler symbols when encoding aspects of a data burst. By selecting the degree of randomization (e.g., of the selected or encoded filler symbols), the memory system 110 may control a trade-off between reducing emission peaks and reducing power consumption overhead. Further, these randomizing techniques may provide an alternative to a sleep state, which would otherwise cause the memory system 110 to go out of sync when data symbols are not available for transmission.

Figure 2:
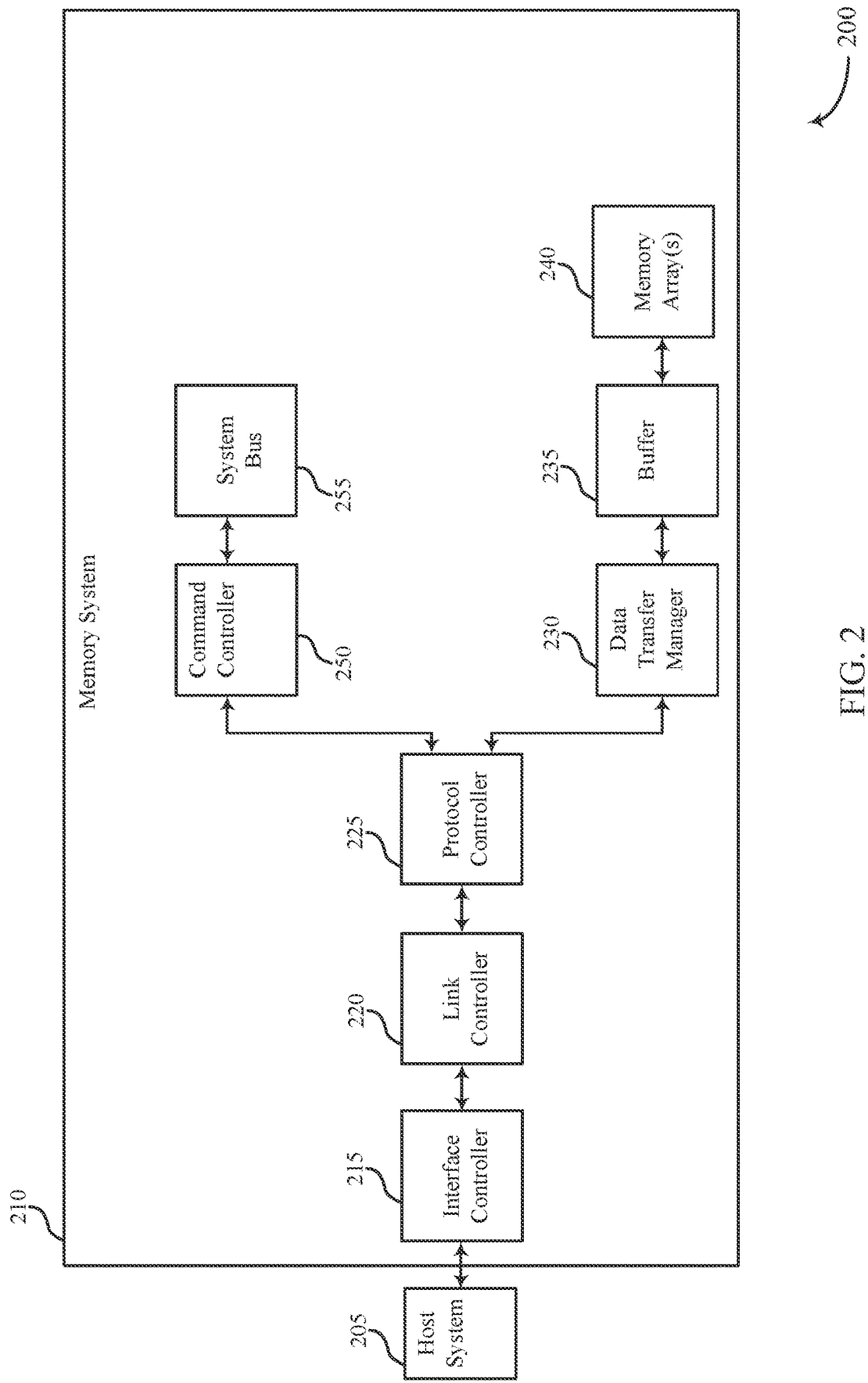
FIG. 2 illustrates an example of a system that supports filler symbols for data bursts in accordance with examples as disclosed herein.

FIG. 2 illustrates an example of a system 200 that supports filler symbols for data bursts in accordance with examples as disclosed herein. In some examples, the system 200 may include a host system 205 and a memory system 210. The host system 205 and the memory system 210 may be examples of the host system 105 and the memory system 110, respectively, as described with reference to FIG. 1. The memory system 210 may include an interface controller 215, a link controller 220, and a protocol controller 225. The memory system 210 may also include a data transfer manager (DTM) 230, a buffer 235, and one or more memory arrays 240, which may be utilized when processing data. Additionally, or alternatively, the memory system 210 may include a controller 250 (e.g., a general-purpose command controller 250) and a system bus 255 which may be utilized w % ben processing control information. The components of the memory system 210 may be configured to insert, into a data burst (e.g., a stream) of one or more data symbols, a sequence of one or more filler symbols.

The host system 205 may communicate with the memory system 210. For example, the host system 205 may transmit packets that include one or more payloads. In some instances, the payloads may include or may be part of commands (e.g., read commands, write commands, other commands). The packets may be received by the interface controller 215 and commands included in the packets may be processed by the protocol controller 225

In some examples, the host system 205 may communicate the packets to the interface controller 215, which may utilize a UniPro® protocol stack and may include a physical interface that includes one or more serial data lanes. As described herein, the interface controller 215 may be configured to generate protocol units (e.g., upon receiving a write command from the host system 205) and data units (e.g., upon receiving a read command from the host system 205) for communicating to the link controller 220 and the host system 205, respectively.

The memory system 210 may include a link controller 220 that is coupled with the interface controller 215. In some instances, the link controller 220 may be referred to as a Universal Flash Storage (UFS) link controller 220, and may operate according to a UFS protocol. The link controller 220 may receive protocol units from the interface controller 215, in the instance of a write operation, and may communicate the protocol units to the protocol controller 225. In the instance of read operations, the link controller 220 may receive protocol units from the protocol controller 225 and may communicate the protocol units to the interface controller 215.

In some examples, the memory system 210 may include a protocol controller 225 that is coupled with the link controller 220. The protocol controller 225 may operate according to a UFS protocol and may receive protocol units from the link controller 220 (e.g., during a write operation). As described herein, the interface controller 215 may utilize a UniPro® protocol stack. However, upon receiving a command (e.g., a read command) and performing certain operations on fields of the command to generate a protocol unit, the protocol unit may be communicated to the protocol controller 225 using signaling that is the same as or resembles UFS signaling. When the protocol controller 225 receives the protocol unit, it can either communicate the protocol unit to the DTM 230 if the protocol unit is associated with data or to the command controller 250 if the protocol unit is associated with control information. The DTM 230 may receive and process the protocol unit. In some examples, the DTM 230 may process the protocol unit to obtain a data storage unit, which may be written to a memory array 240.

Additionally, or alternatively, the protocol controller 225 may communicate a protocol unit associated with control information to the command controller 250. As used herein, the term control information may refer to any information associated with a command received from the host system 205 other than data to be read from or written to a memory array 240. In some examples, the protocol unit comprising the control information may be processed by the command controller 250 and may be communicated to a system bus 255. The system bus 255 may communicate the control information to a portion or component of the memory system 210 associated with the control information.

In some examples, one or more components of the memory system 210 may be configured to insert, into a data burst (e.g., a stream) of one or more data symbols, a sequence of one or more filler symbols. For example, the interface controller 215 may be configured to identify a duration when data symbols are not received from the host system 205. To maintain an active data burst, the interface controller 215 (or another component of the memory system 210) may select one or more filler symbols to insert into the data burst.

For example, the memory system 210 may identify the last data symbol received and may select (e.g., randomly) one or more filler symbols to insert after the last data symbol received. In some cases, the one or more filler symbols may be randomly selected from a set of control symbols. Additionally or alternatively, one or more pairs of filler symbols may be encoded and mapped to a sequence. For example, each pair of filler symbols may include a bit-sequence (e.g., a sixteen bit sequence) where each filler symbol (e.g., FLR) includes a first quantity of bits (e.g., eight bits). The filler symbols may be mapped to a sequence (e.g., FLR or ~FLR) where each filler symbol includes a second quantity of bits (e.g., ten bits). In some cases, randomizing the selection of filler symbols or randomly mapping pairs of filler symbols to different sequences may reduce the periodicity of the transmitted filler symbols, and may thus mitigate EMI that would otherwise be caused by the signaling.

FIG. 3 illustrates an example of a layer diagram 300 that supports filler symbols for data bursts in accordance with examples as disclosed herein. In some examples, the layer diagram 300 may illustrate a communication stack utilized by a memory system (e.g., a memory system 210 as described with reference to FIG. 2). The layer diagram 300 may illustrate a communication stack that includes application-specific protocols (LA) 305, a transport layer 310, a network layer 315, a data link layer 320, a physical (PHY) adapter layer 325, and a PHY layer 330. The protocol stack may support the detection and correction of errors, by components of the memory system, that occur along data paths of the memory system, which may improve the overall performance and reliability of the memory system.

The layer diagram 300 may illustrate aspects of data flow in a system that includes a transmitter and a receiver. In some examples, a memory system (e.g., a memory system 210 as described with reference to FIG. 2) may be an example of such system. In some examples, the layer diagram 300 may illustrate aspects of the communication functions performed by a transmitter (e.g., an M-PHY transmitter). In other examples, the aspects of the communication functions may be described in the context of an interface controller (e.g., an interface controller 215 as described with reference to FIG. 2). For example, the interface controller may receive commands according to an application-specific protocol, such as a UFS protocol. The interface controller may manage the flow of data within the memory system according to the transport layer 310, network layer 315, data link layer 320, PHY adapter layer 325, and PHY layer 330.

In some examples, the layer diagram 300 illustrates a transport layer 310 (e.g., Layer 4), which may be implemented by a memory system and may enable different devices (e.g., different components of the memory system) to share the network in a controlled manner. For example, the transport layer 310 may provide flow control functionality to provide a level of addressing within the memory system, which may allow the interface controller to connect and communicate with other devices, such as a link controller 220, a protocol controller, a data storage controller, and a command controller 250 as described with reference to FIG. 2. In some examples, data units associated with the transport layer 310 may be referred to as segments.

The layer diagram 300 also illustrates a network layer 315 (e.g., Layer 3), which may be implemented by a memory system and may be utilized for addressing to route data packets throughout the memory system. For example, the network layer 315 may be utilized to route data packets from the interface controller to a memory array (e.g., a memory array 240 as described with reference to FIG. 2). In some instances, a data packet may be routed to an address using a header that includes a destination address. Data units associated with the network layer 315 may be referred to as packets.

The layer diagram 300 illustrates a data link layer 320 (e.g., Layer 2), which may be implemented by a memory system and may allow for communications between adjacent nodes (e.g., components that are coupled together) in a memory system. For example, the data link layer 320 may communicate data frames that each include a start-of-data-frame field and an end-of-data-frame field. In other examples, the data link layer 320 may communicate control frames that each include a start-of-data-frame field and an end-of-data-frame field. A data frame or a control frame communicated by the data link layer 320 may also include a payload and one or more sets of parity bits as described herein. In some examples, data units associated with the data link layer 320 may be referred to as frames (e.g., data frames).

In some examples, the layer diagram 300 illustrates a PHY adapter layer 325 (e.g., Layer 1.5) which may be implemented by a transmitter, which may be included in a memory system. The PHY adapter layer 325 may abstract (e.g., hide) any differences between D-PHY and M-PHY signaling, which may improve the overall flexibility of the memory system. Data units associated with the PHY adapter layer 325 may be referred to as UniPro symbols.

In some cases, the PHY adapter layer 325 may be configured to select filler symbols to insert in a data burst of UniPro symbols from the PHY adapter layer 325. In some examples, the filler symbols may be selected from used or unused control symbols and may be selected at random. For example, when the PHY adapter layer 325 determines that there are no additional UniPro symbols to transmit, the PHY adapter layer may select and transmit one or more filler symbols to maintain an active data burst. As described herein, randomizing the filler symbols may reduce signal periodicity, and selecting a relatively greater quantity randomized filler symbols may further-reduce signal periodicity.

In some examples, the layer diagram 300 illustrates a PHY layer 330 (e.g., Layer 1), which may be implemented by a transmitter, which may be included in a memory system. The PHY layer 330 may allow for inter-chip (e.g., inter-memory-system) communication such as D-PHY and M-PHY. D-PHY signaling may communicate PHY symbols, clock signals, and signaling related to encoding or decoding operations. Additionally, or alternatively, M-PHY signaling may support relatively higher-speed data rates and may utilize fewer signal wires because the clock signal is embedded with the data. Data units associated with the PHY layer 330 may be referred to as symbols (e.g., PHY symbols).

In some cases, the PHY layer 330 may be configured to encode filler symbols within a pair of filler symbols. When encoding the same filler symbols (e.g., <FLR. FLR>), the PHY layer 330 may encode each filler symbol to a twenty-bit sequence. For example, each filler symbol (e.g., FLR) including a first quantity of bits (e.g., eight bits) may be mapped to a filler symbol (e.g., flr) including a second quantity of bits (e.g., ten bits). In some cases, the mapping may be based on a running disparity (RD) value (e.g., a running count of the disparity between the number of 0s and 1s in the encoded bitstream). Accordingly, the resulting twenty-bit sequence may include a ten-bit filler symbol and a complement of the ten-bit filler symbol (e.g., <flr, ~flr>). In some cases, a second encoding process may randomly interchange the order of the previously encoded filler symbols. For example, the pair of filler symbols (e.g., <flr, ~flr>) may be mapped to the original order (e.g., <flr, ~flr>) or mapped to a different order (e.g., <~flr, flr>). Similar to the process performed by the PHY adapter layer 325, the PHY layer 330 may map one or more filler symbols to a sequence, which may mitigate EMI that would otherwise be caused by the signaling. As described herein, one or more pairs of filler symbols may be encoded and mapped to a sequence.

Figure 4:
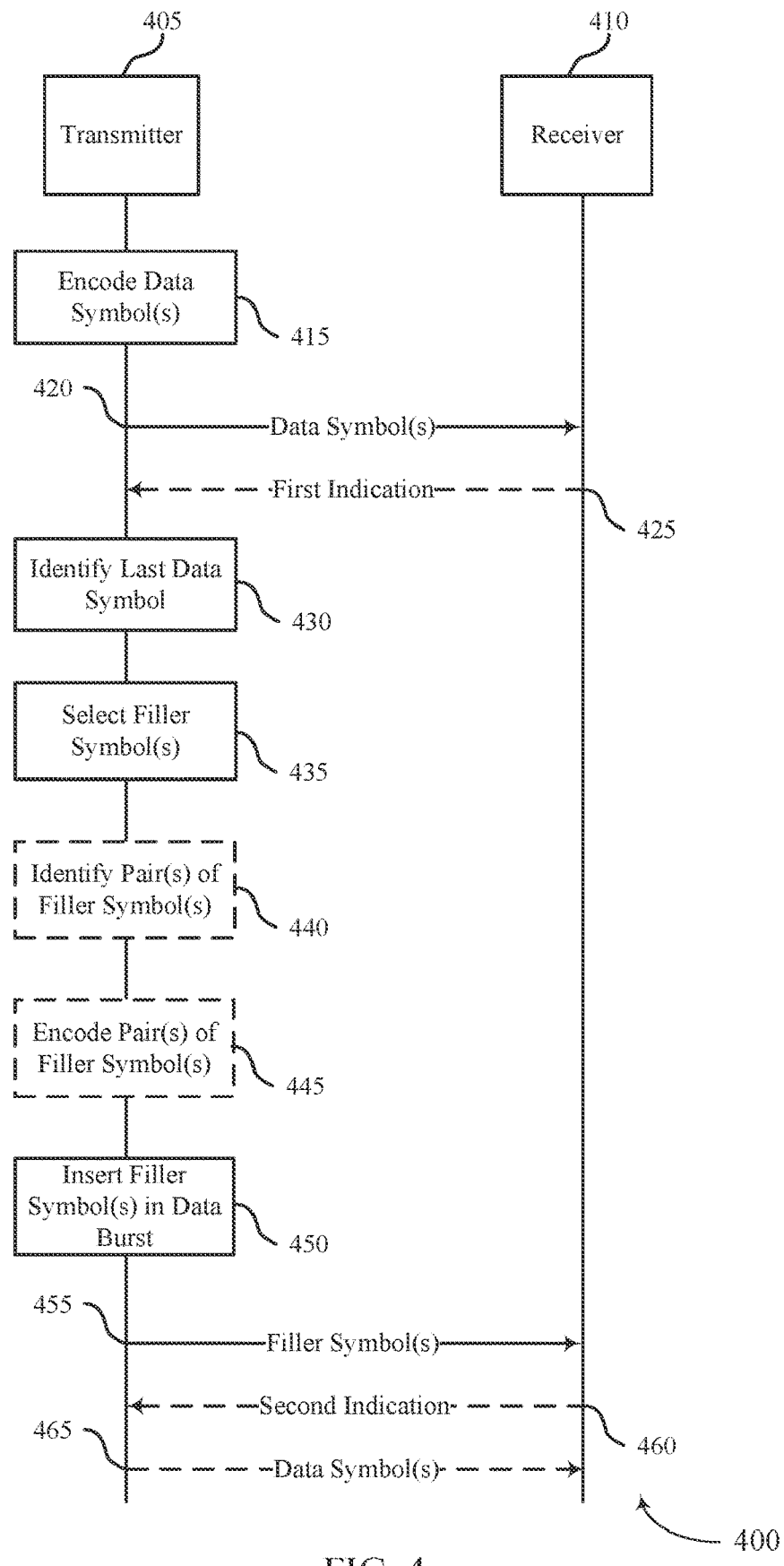
FIG. 4 illustrates an example of a process flow diagram that supports filler symbols for data bursts in accordance with examples as disclosed herein.

FIG. 4 illustrates an example of a process flow diagram 400 that supports filler symbols for data bursts in accordance with examples as disclosed herein. In some examples, the process flow diagram 400 may illustrate operations performed between a transmitter 405 and a receiver 410. In some examples, such operations may be performed at a memory system or between devices having a transmitter (e.g., an M-PHY transmitter) and a receiver (e.g., an M-PHY receiver). The associated system may include other components, such as the components described with reference to FIG. 2, that are not illustrated in the process flow diagram 400. The process flow diagram 400 may illustrate selection and signaling of data symbols and randomized filler symbols of a high-speed data burst, which may improve the overall performance of the associated device.

At 415, the transmitter 405 may encode one or more data symbols (e.g., PHY symbols) for transmission to the receiver 410. For example, the data symbols may be a portion of a data burst of fixed length that is transmitted to the receiver 410, and the data burst may include one or more other data symbols, one or more filler symbols (e.g., PHY filler symbols), or both in a sequence. In some examples, each data symbol may be encoded through 8b10b encoding or a modified version of 8b10b encoding.

At 420, the transmitter 405 may transmit the one or more data symbols to the receiver 410 in a sequence (e.g., consecutively). In some examples, the sequence of data symbols may be transmitted after the transmitter 405 transmits one or more other symbols (e.g., data symbols, filler symbols, or the like), before the transmitter 405 transmits one or more other symbols, or both.

In some cases, at 425, the transmitter 405 may receive a first indication from the receiver 410. The first indication may signal that the receiver 410 is unavailable to receive one or more additional data symbols (e.g., after the one or more data symbols transmitted at 415). In response to the first indication, the transmitter 405 may refrain from transmitting one or more additional data symbols to the receiver 410. Additionally or alternatively, the transmitter 405 may monitor for a second indication from the receiver 410 that indicates the receiver 410 may receive one or more additional data symbols. In some examples, the transmitter 405 may refrain from transmitting the one or more additional data symbols until receiving the second indication or until a time indicated by the second indication.

In some cases, at 430, the transmitter 405 may identify a last data symbol of the sequence of one or more data symbols transmitted at 415. In some cases, the transmitter 405 may identify the last data symbol based on completing the transmission of the sequence to the receiver 410. For example, after completing the transmission of the sequence, the transmitter 405 may determine that there are no additional data symbols to be transmitted (e.g., at that time). Additionally, or alternatively, the transmitter 405 may determine whether any additional data symbols are scheduled for transmission at a later time. In some cases, if the transmitter 405 receives the first indication at 420, the transmitter 405 may identify the last data symbol based on the first indication.

In some cases, at 435, the transmitter 405 may select one or more filler symbols (e.g., FLR symbols) to transmit to the receiver 410 from the PHY adapter layer 325. For example, to maintain an active data burst, the transmitter 405 may determine to transmit one or more filler symbols after the last data symbol. In some cases, the one or more filler symbols may be selected from a set of filler symbols (e.g., previously used or unused control symbols {FLR1, FLR2, . . . , FLRN}). Additionally or alternatively, the transmitter 405 may select a first filler symbol of a first type for transmitting to the receiver 410, followed by a second filler symbol of a second type, which may be a same or different type of filler symbol. That is, the transmitter 405 may select a filler symbol type for a single filler symbol, and send the single filler symbol of that type before choosing again (e.g., for the next filler symbol). By selecting types of filler symbols (e.g., at random) for transmission, the transmitter 405 may reduce the periodicity of the transmitted signal.

In some cases, the transmitter 405 may be configured to control the degree of randomization when selecting each of the one or more filler symbols. For example, the one or more filler symbols may be selected according to a probability setting, a quantity of used or unused control symbols (e.g., N), a random distribution of the used or unused control symbols, or a combination thereof.

In one example, the transmitter 405 may randomly select between a first control symbol and a second control symbol (e.g., {FLR1, FLR2}) for each respective filler symbol with an equal probability (e.g., 50%) or an unequal probability. In other examples, when selecting from more than two control symbols, the transmitter 405 may randomly select between each of the control symbols (e.g., {FLR1, . . . , FLRN}) for each respective filler symbol with an equal probability or an unequal probability. Because each filler symbol may be randomly selected (e.g., selected independent of previously selected filler symbols) the same type of filler symbol may be selected for two or more of the filler symbols. For example, the same control symbol may be selected by two successive selections (e.g., FLR1 followed by FLR1). Alternatively, the same control symbol may be selected two or more times, but not successively (e.g., FLR1, FLR2, and FLR1 again).

In some cases, the transmitter 405 may adjust the quantity of control symbols to choose from, such that the randomization of filler symbols is increased (e.g., with a larger quantity N to choose from) or reduced (e.g., with a smaller quantity N to choose from). For example, by dynamically adjusting the quantity of control symbols to select filler symbols from, the transmitter 405 may balance the reduction in periodicity of a symbol with a level of power consumption of the associated device.

In some cases, at 440, the transmitter 405 may randomize the one or more filler symbols to transmit to the receiver 410 from the PHY layer 330 rather than from the PHY adapter layer 325. For example, the transmitter 405 identify a first pair of filler symbols for transmission (e.g., to maintain the active data burst). In such cases, the first filler symbol and the second filler symbol of the first pair of filler symbols may be the same symbol. For example, the first pair of filler symbols may include the same control symbol (e.g., {FLR, FLR}). In some examples, the transmitter 405 may identify the first filler symbols based on encoding the one or more data symbols of the data burst. For example, after encoding the one or more data symbols, the transmitter 405 may determine that there are no additional data symbols to encode. Additionally or alternatively, after or during transmitting the one or more data symbols, the transmitter 405 may identify one or more filler symbols for transmission to the receiver 410. For example, if the transmitter 405 receives the first indication from the receiver 410, the transmitter 405 may identify filler symbols until the receiver 410 is able to receive data symbols.

In some cases, the transmitter 405 may identify a second pair of filler symbols for transmission. For example, the transmitter 405 may identify that second pair of filler symbols is adjacent to (e.g., before or after) the first pair of filler symbols in the sequence of symbols. The second pair of filler symbols may include the same control symbols (e.g., {FLR, FLR}) as the first pair of filler symbols or, in some instances, may include different control symbols. In some cases, one or more of the pairs of filler symbols may be separated by one or more data symbols within the data sequence.

In some cases, the PHY layer 330 may be configured to encode filler symbols within a pair of filler symbols. When encoding the same filler symbols (e.g., <FLR, FLR>), the PHY layer 330 may encode each filler symbols to a ten-bit sequence. For example, each filler symbol (e.g., FLR) including a first quantity of bits (e.g., eight bits) may be mapped to a filler symbol (e.g., flr) including a second quantity of bits (e.g., ten bits). In some cases, the mapping may be based on a running disparity (RD) value (e.g., a running count of the disparity between the number of 0s and 1s in the encoded bitstream). Accordingly, the resulting twenty-bit sequence may include a ten-bit filler symbol and a complement of the ten-bit filler symbol (e.g., <flr, ~flr>). In some cases, a second encoding process may randomly interchange the order of the previously encoded filler symbols. For example, the pair of filler symbols (e.g., <flr, ~flr>) may be mapped to the original order (e.g., <flr, ~flr>) or mapped to a different order (e.g., <~flr, flr>).

In some cases, at 445, the transmitter 405 may encode each of the one or more identified pairs of filler symbols. In some examples, step 445 may include two encoding operations. For example, during a first encoding process, the transmitter 405 may randomly encode (e.g., map) each filler symbol (e.g., FLR) to a ten-bit sequence. For example, each filler symbol (e.g., FLR) including a first quantity of bits (e.g., eight bits) may be mapped to a filler symbol (e.g., flr) including a second quantity of bits (e.g., ten bits). In some cases, the mapping may be based on a running disparity (RD) value (e.g., a running count of the disparity between the number of 0s and 1s in the encoded bitstream). Accordingly, the resulting twenty-bit sequence (e.g., pair of filler symbols) may include a ten-bit filler symbol and a complement of the ten-bit filler symbol (e.g., <flr, ~flr>).

During a second encoding process, the transmitter 405 may randomly encode the previously encoded pair of filler symbols (e.g., <flr, ~flr>, resulting from the first encoding step) by randomly interchanging the order of the pair. For example, the second encoding process may either encode the pair of filler symbols to their original order (e.g., <flr, ~flr>) or to a reverse order (<~flr, flr>). The interchanging order for each pair of filler symbols may be selected randomly, with equal or unequal probability, and independent of other pairs of filler symbols. In some examples, the bitwise complement within the first pair of encoded filler symbols may be located in a different position (e.g., first) than the bitwise complement within the second pair of encoded filler symbols (e.g., last). In other examples, although randomized, two or more consecutive pairs of encoded filler symbols may have the same order. For example, the bitwise complement within the first pair of encoded filler symbols may be located in a same position as the bitwise complement within the second pair of encoded filler symbols. Although described as two encoding processes, step 445 may include any number of encoding processes.

At 450, after either randomizing procedure described herein, the transmitter 405 may insert the one or more filler symbols into the data burst. For example, the one or more filler symbols (or the one or more pairs of filler symbols) may be inserted into the data burst after the sequence of one or more data symbols. In some examples, the one or more filler symbols may be inserted adjacent to the last data symbol of the one or more data symbols. In some examples, the one or more filler symbols may be inserted in between data symbols, such that one or more additional data symbols are transmitted to the receiver 410 after the filler symbols.

At 455, the transmitter 405 may transmit the one or more filler symbols to the receiver 410. For example, the one or more selected filler symbols, or the one or more pairs of encoded filler symbols, may be transmitted (e.g., sequentially) to the receiver 410 as a part of the data burst. In some cases, the one or more filler symbols transmitted by the transmitter 405 may impact a periodicity of the data burst. For example, a higher quantity of repeated filler symbols (e.g., the same control symbols) in the sequence of filler symbols may result in a relatively higher periodicity than a sequence with no (or fewer) repeating filler symbols.

The quantity of filler symbols transmitted to the receiver 410 may also impact the periodicity. For example, a relatively larger quantity of filler symbols may have a higher probability of repeating filler symbols, and therefore a relatively higher periodicity than a sequence having no (or fewer) repeating filler symbols. Likewise, the quantity of used or unused control symbols (e.g., N), the random distribution of the used or unused control symbols, or both, may also impact the periodicity. For example, when each filler symbol is selected from a relatively smaller set of control symbol, there may be a higher probability of repeating filler symbols, and therefore a relatively higher periodicity than a sequence with no (or fewer) repeating filler symbols.

In some cases, at 460, the transmitter 405 may receive a second indication from the receiver 410. The second indication may signal that the receiver 410 is available to receive one or more additional data symbols (e.g., after the one or more filler symbols transmitted at 455). For example, the second indication may indicate a quantity of additional data symbols that the receiver 410 is available to receive, a time at which the receiver 410 is available to receive additional data symbols, or a combination thereof. In some examples, the transmitter 405 may continue to monitor for a third indication from the receiver 410, indicating that the receiver 410 is unavailable to receive one or more additional data symbols.

In some cases, at 465, the transmitter 405 may transmit the one or more additional data symbols (e.g., a second sequence of data symbols) to the receiver 410. For example, in response to the second indication, the transmitter 405 may refrain from transmitting one or more additional filler symbols and may transmit the second sequence of data symbols to the receiver 410. As described herein, each of the first sequence of data symbols, the one or more filler symbols, and the second sequence of data symbols, may be elements of the same active data burst from the transmitter 405 to the receiver 410. In some examples, this sequence, or a similar sequence, of data symbols and filler symbols may occur multiple times throughout the active data burst. Transmitting filler symbols between a transmitter 405 and a receiver 410 as described herein may mitigate EMI that would otherwise be caused by the signaling.

Figure 5:
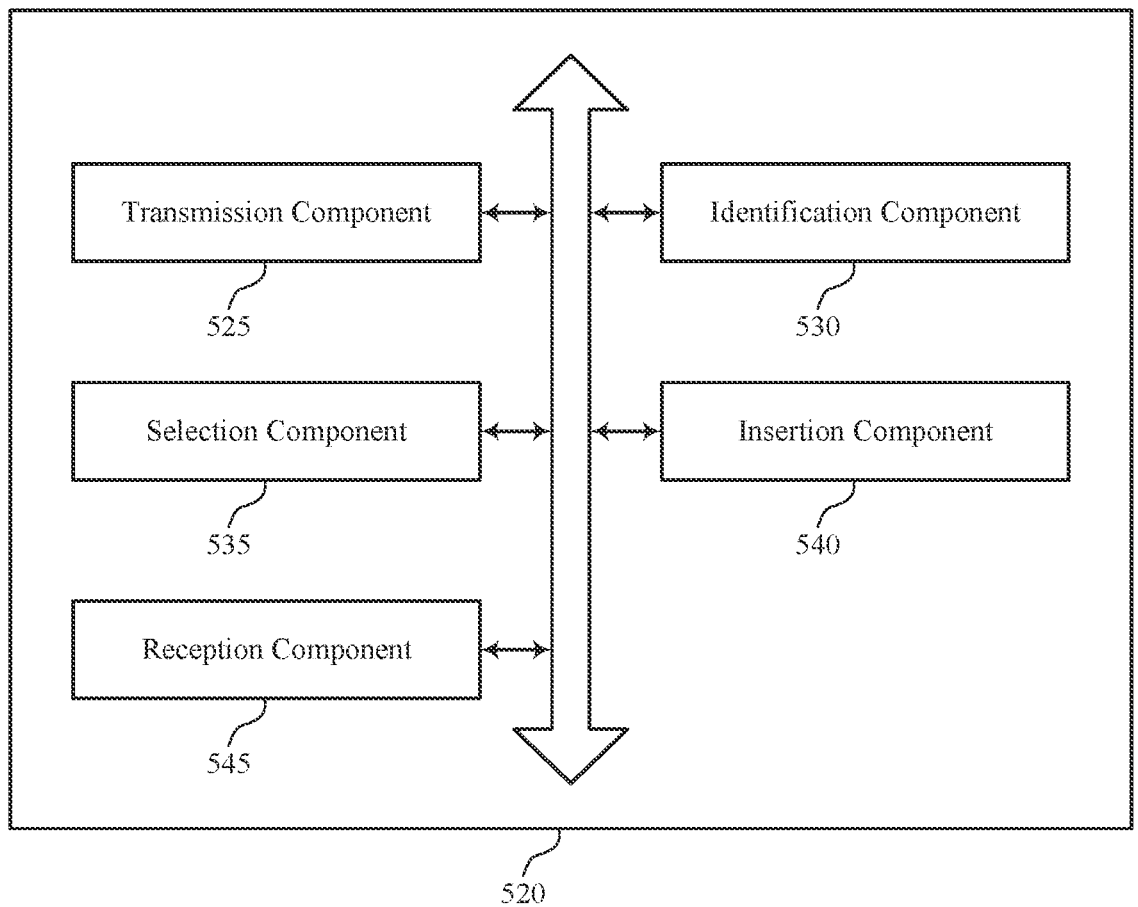
FIGS. 5 and 6 illustrate block diagrams of a transmitter that supports filler symbols for data bursts in accordance with examples as disclosed herein.

FIG. 5 illustrates a block diagram 500 of a transmitter 520 that supports filler symbols for data bursts in accordance with examples as disclosed herein. The transmitter 520 may be an example of aspects of a transmitter as described with reference to FIGS. 1 through 4. The transmitter 520, or various components thereof, may be an example of means for performing various aspects of filler symbols for data bursts as described herein. For example, the transmitter 520 may include a transmission component 525, an identification component 530, a selection component 535, an insertion component 540, a reception component 545, or any combination thereof. Each of these components may communicate, directly or indirectly, with one another (e.g., via one or more buses).

The transmission component 525 may be configured as or otherwise support a means for transmitting, by a transmitter, a sequence of one or more data symbols of a data burst, where the sequence of one or more data symbols are transmitted to a receiver. The identification component 530 may be configured as or otherwise support a means for identifying a last data symbol included in the sequence of one or more data symbols based on transmitting the sequence of one or more data symbols to the receiver. The selection component 535 may be configured as or otherwise support a means for selecting a first filler symbol and a second filler symbol from a plurality of filler symbols, where the first filler symbol includes a first type of control symbol and the second filler symbol includes a second type of control symbol. In some examples, the transmission component 525 may be configured as or otherwise support a means for transmitting, by the transmitter, the first filler symbol and the second filler symbol based on selecting the first filler symbol and the second filler symbol from the plurality of filler symbols, where the first filler symbol and the second filler symbol are transmitted to the receiver within the data burst.

In some examples, to support selecting the first filler symbol and the second filler symbol, the selection component 535 may be configured as or otherwise support a means for selecting, randomly, the first filler symbol and the second filler symbol, where the first filler symbol and the second filler symbol are each associated with a respective probability for being selected.

In some examples, a periodicity of the data burst is based on a type of control symbols, a quantity of filler symbols of the plurality of filler symbols transmitted to the receiver, a periodicity that a type of control symbol is transmitted to the receiver, or a combination thereof.

In some examples, each filler symbol of the plurality of filler symbols includes a respective control symbol of an M-PHY symbol set.

In some examples, selecting the first filler symbol and the second filler symbol from a plurality of filler symbols is based on identifying the last data symbol included in the sequence of one or more data symbols.

In some examples, the insertion component 540 may be configured as or otherwise support a means for inserting the first filler symbol and the second filler symbol into the data burst, where the first filler symbol and the second filler symbol are inserted after the sequence of one or more data symbols.

In some examples, the reception component 545 may be configured as or otherwise support a means for receiving, by the transmitter, a first indication that the receiver is unavailable to receive one or more additional data symbols based on transmitting the sequence of one or more data symbols, where transmitting the first filler symbol and the second filler symbol is based on receiving the first indication.

In some examples, the transmission component 525 may be configured as or otherwise support a means for refraining from transmitting one or more additional data symbols to the receiver based on receiving the first indication, where identifying the last data symbol included in the sequence of one or more data symbols is based on refraining from transmitting the one or more additional data symbols to the receiver.

In some examples, the reception component 545 may be configured as or otherwise support a means for receiving, by the transmitter, a second indication that the receiver is available to receive one or more additional data symbols based on transmitting the first filler symbol and the second filler symbol. In some examples, the transmission component 525 may be configured as or otherwise support a means for transmitting, by the transmitter, one or more additional data symbols to the receiver based on receiving the second indication.

In some examples, the transmitter includes an M-PHY transmitter and the receiver includes an M-PHY receiver.

Figure 6:
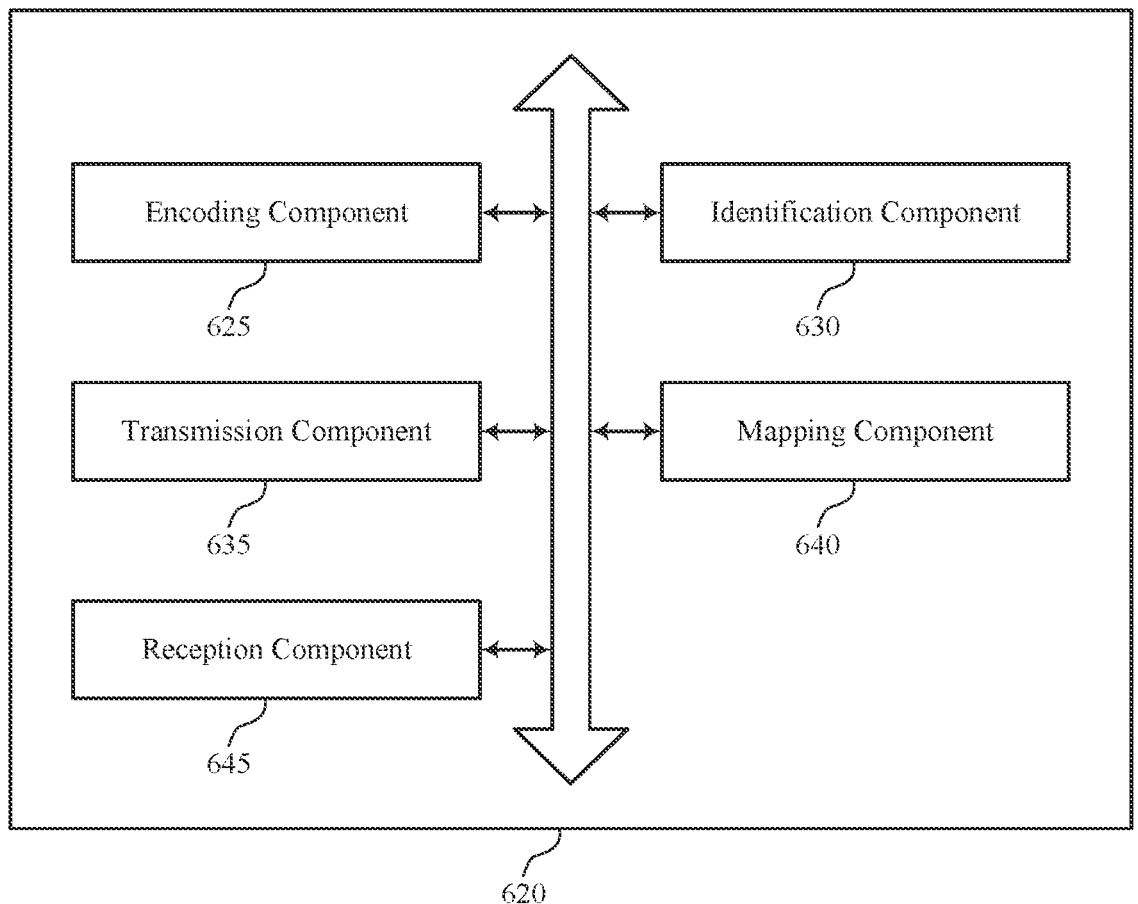

FIG. 6 illustrates a block diagram 600 of a transmitter 620 that supports filler symbols for data bursts in accordance with examples as disclosed herein. The transmitter 620 may be an example of aspects of a transmitter as described with reference to FIGS. 1 through 4. The transmitter 620, or various components thereof, may be an example of means for performing various aspects of filler symbols for data bursts as described herein. For example, the transmitter 620 may include an encoding component 625, an identification component 630, a transmission component 635, a mapping component 640, a reception component 645, or any combination thereof. Each of these components may communicate, directly or indirectly, with one another (e.g., via one or more buses).

The encoding component 625 may be configured as or otherwise support a means for encoding, by a transmitter, one or more data symbols of a data burst, where the data burst includes the one or more data symbols and two or more pairs of filler symbols. The identification component 630 may be configured as or otherwise support a means for identifying each pair of the two or more pairs of filler symbols based on encoding the one or more data symbols of the data burst, where each filler symbol of the two or more pairs of filler symbols includes a first quantity of bits. In some examples, the encoding component 625 may be configured as or otherwise support a means for encoding, by the transmitter, each pair of filler symbols of the two or more pairs of filler symbols based on identifying each pair of filler symbols, where encoding each pair of filler symbols includes generating a bitwise complement of a respective first filler symbol or a respective second filler symbol of each pair of filler symbols, where each filler symbol of the two or more pairs of filler symbols includes a second quantity of bits based on the encoding. The transmission component 635 may be configured as or otherwise support a means for transmitting, by the transmitter, each pair of encoded filler symbols as part of the data burst, where the data burst is transmitted to a receiver.

In some examples, to support encoding each pair of filler symbols, the mapping component 640 may be configured as or otherwise support a means for mapping, randomly, a first filler symbol of each pair of filler symbols to a first sequence or a second sequence. In some examples, to support encoding each pair of filler symbols, the mapping component 640 may be configured as or otherwise support a means for mapping a second filler symbol of each pair of filler symbols to the first sequence or the second sequence, where the first filler symbol of each pair of filler symbols is mapped to a different sequence than the second filler symbol of each pair of filler symbols.

In some examples, the reception component 645 may be configured as or otherwise support a means for receiving, by the transmitter, a first indication that the receiver is unavailable to receive one or more additional data symbols. In some examples, the transmission component 635 may be configured as or otherwise support a means for refraining from transmitting one or more additional encoded data symbols based on receiving the first indication.

In some examples, the reception component 645 may be configured as or otherwise support a means for receiving, by the transmitter, a second indication that the receiver is available to receive one or more additional data symbols. In some examples, the transmission component 635 may be configured as or otherwise support a means for transmitting, by the transmitter, one or more additional encoded data symbols to the receiver based on receiving the second indication.

In some examples, a first pair of the two or more pairs of filler symbols are adjacent to a last data symbol of the data burst.

In some examples, to support transmitting each pair of encoded filler symbols as part of the data burst, the transmission component 635 may be configured as or otherwise support a means for transmitting each encoded pair of filler symbols of the two or more pairs of filler symbols sequentially.

In some examples, the transmitter includes an M-PHY transmitter and the receiver includes an M-PHY receiver.

In some examples, the second quantity of bits is greater than the first quantity of bits.

Figure 7:
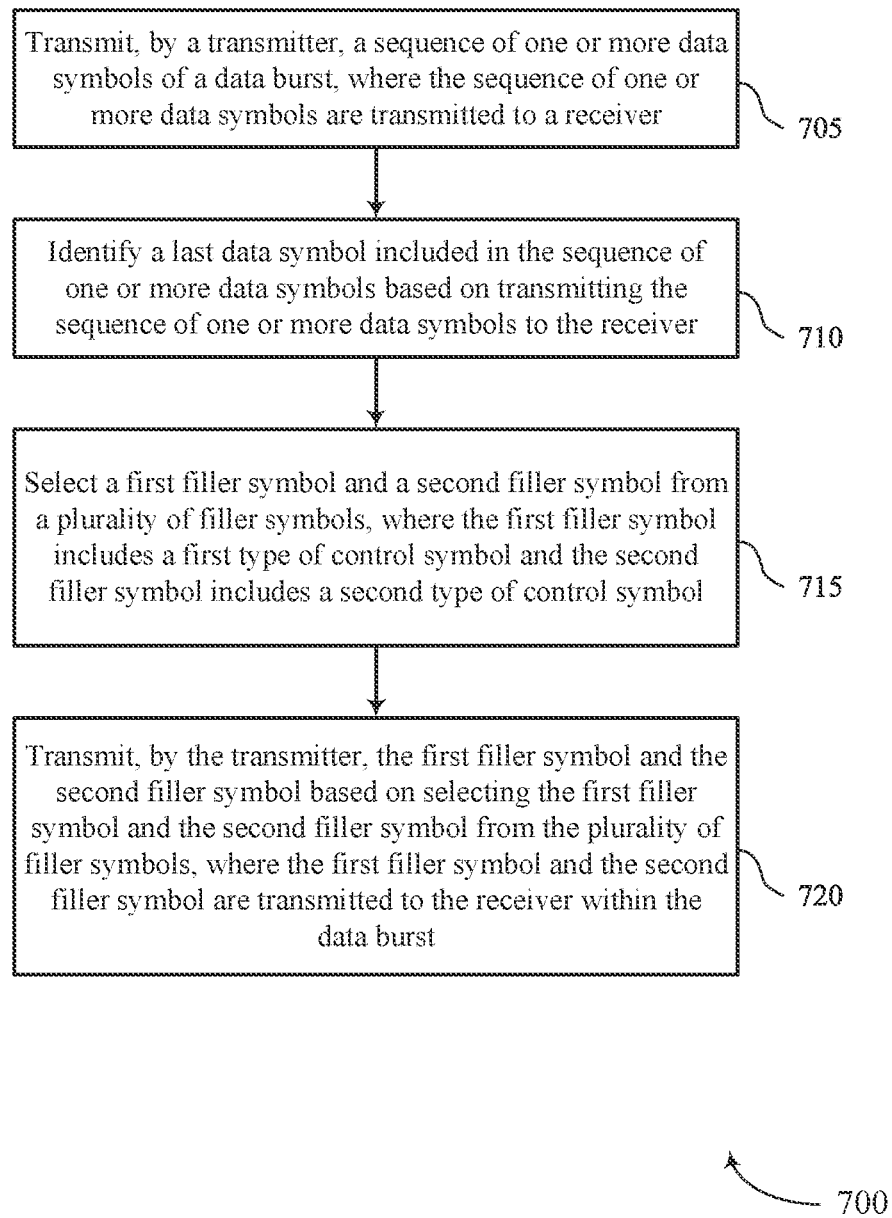
FIGS. 7 and 8 illustrate flowcharts showing a method or methods that support filler symbols for data bursts in accordance with examples as disclosed herein.

FIG. 7 illustrates a flowchart showing a method 700 that supports filler symbols for data bursts in accordance with examples as disclosed herein. The operations of method 700 may be implemented by a transmitter or its components as described herein. For example, the operations of method 700 may be performed by a transmitter as described with reference to FIGS. 1 through 5. In some examples, a transmitter may execute a set of instructions to control the functional elements of the device to perform the described functions.

Additionally, or alternatively, the transmitter may perform aspects of the described functions using special-purpose hardware.

At 705, the method may include transmitting, by a transmitter, a sequence of one or more data symbols of a data burst, where the sequence of one or more data symbols are transmitted to a receiver. The operations of 705 may be performed in accordance with examples as disclosed herein. In some examples, aspects of the operations of 705 may be performed by a transmission component 525 as described with reference to FIG. 5.

At 710, the method may include identifying a last data symbol included in the sequence of one or more data symbols based on transmitting the sequence of one or more data symbols to the receiver. The operations of 710 may be performed in accordance with examples as disclosed herein. In some examples, aspects of the operations of 710 may be performed by an identification component 530 as described with reference to FIG. 5.

At 715, the method may include selecting a first filler symbol and a second filler symbol from a plurality of filler symbols, where the first filler symbol includes a first type of control symbol and the second filler symbol includes a second type of control symbol. The operations of 715 may be performed in accordance with examples as disclosed herein. In some examples, aspects of the operations of 715 may be performed by a selection component 535 as described with reference to FIG. 5.

At 720, the method may include transmitting, by the transmitter, the first filler symbol and the second filler symbol based on selecting the first filler symbol and the second filler symbol from the plurality of filler symbols, where the first filler symbol and the second filler symbol are transmitted to the receiver within the data burst. The operations of 720 may be performed in accordance with examples as disclosed herein. In some examples, aspects of the operations of 720 may be performed by a transmission component 525 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transmitting, by a transmitter, a sequence of one or more data symbols of a data burst, where the sequence of one or more data symbols are transmitted to a receiver; identifying a last data symbol included in the sequence of one or more data symbols based on transmitting the sequence of one or more data symbols to the receiver; selecting a first filler symbol and a second filler symbol from a plurality of filler symbols, where the first filler symbol includes a first type of control symbol and the second filler symbol includes a second type of control symbol; and transmitting, by the transmitter, the first filler symbol and the second filler symbol based on selecting the first filler symbol and the second filler symbol from the plurality of filler symbols, where the first filler symbol and the second filler symbol are transmitted to the receiver within the data burst.

Aspect 2: The method, apparatus, or non-transitory computer-readable medium of aspect 1, where selecting the first filler symbol and the second filler symbol includes operations, features, circuitry, logic, means, or instructions, or any combination thereof for selecting, randomly, the first filler symbol and the second filler symbol, where the first filler symbol and the second filler symbol are each associated with a respective probability for being selected.

Aspect 3: The method, apparatus, or non-transitory computer-readable medium of any of aspects 1 through 2, where a periodicity of the data burst is based on a type of control symbols, a quantity of filler symbols of the plurality of filler symbols transmitted to the receiver, a periodicity that a type of control symbol is transmitted to the receiver, or a combination thereof.

Aspect 4: The method, apparatus, or non-transitory computer-readable medium of any of aspects 1 through 3, where each filler symbol of the plurality of filler symbols includes a respective control symbol of an M-PHY symbol set.

Aspect 5: The method, apparatus, or non-transitory computer-readable medium of any of aspects 1 through 4, where selecting the first filler symbol and the second filler symbol from a plurality of filler symbols is based on identifying the last data symbol included in the sequence of one or more data symbols.

Aspect 6: The method, apparatus, or non-transitory computer-readable medium of any of aspects 1 through 5, further including operations, features, circuitry, logic, means, or instructions, or any combination thereof for inserting the first filler symbol and the second filler symbol into the data burst, where the first filler symbol and the second filler symbol are inserted after the sequence of one or more data symbols.

Aspect 7: The method, apparatus, or non-transitory computer-readable medium of any of aspects 1 through 6, further including operations, features, circuitry, logic, means, or instructions, or any combination thereof for receiving, by the transmitter, a first indication that the receiver is unavailable to receive one or more additional data symbols based on transmitting the sequence of one or more data symbols, where transmitting the first filler symbol and the second filler symbol is based on receiving the first indication.

Aspect 8: The method, apparatus, or non-transitory computer-readable medium of aspect 7, further including operations, features, circuitry, logic, means, or instructions, or any combination thereof for refraining from transmitting one or more additional data symbols to the receiver based on receiving the first indication, where identifying the last data symbol included in the sequence of one or more data symbols is based on refraining from transmitting the one or more additional data symbols to the receiver.

Aspect 9: The method, apparatus, or non-transitory computer-readable medium of any of aspects 1 through 8, further including operations, features, circuitry, logic, means, or instructions, or any combination thereof for receiving, by the transmitter, a second indication that the receiver is available to receive one or more additional data symbols based on transmitting the first filler symbol and the second filler symbol and transmitting, by the transmitter, one or more additional data symbols to the receiver based on receiving the second indication.

Aspect 10: The method, apparatus, or non-transitory computer-readable medium of any of aspects 1 through 9, where the transmitter includes an M-PHY transmitter and the receiver includes an M-PHY receiver.

Figure 8:
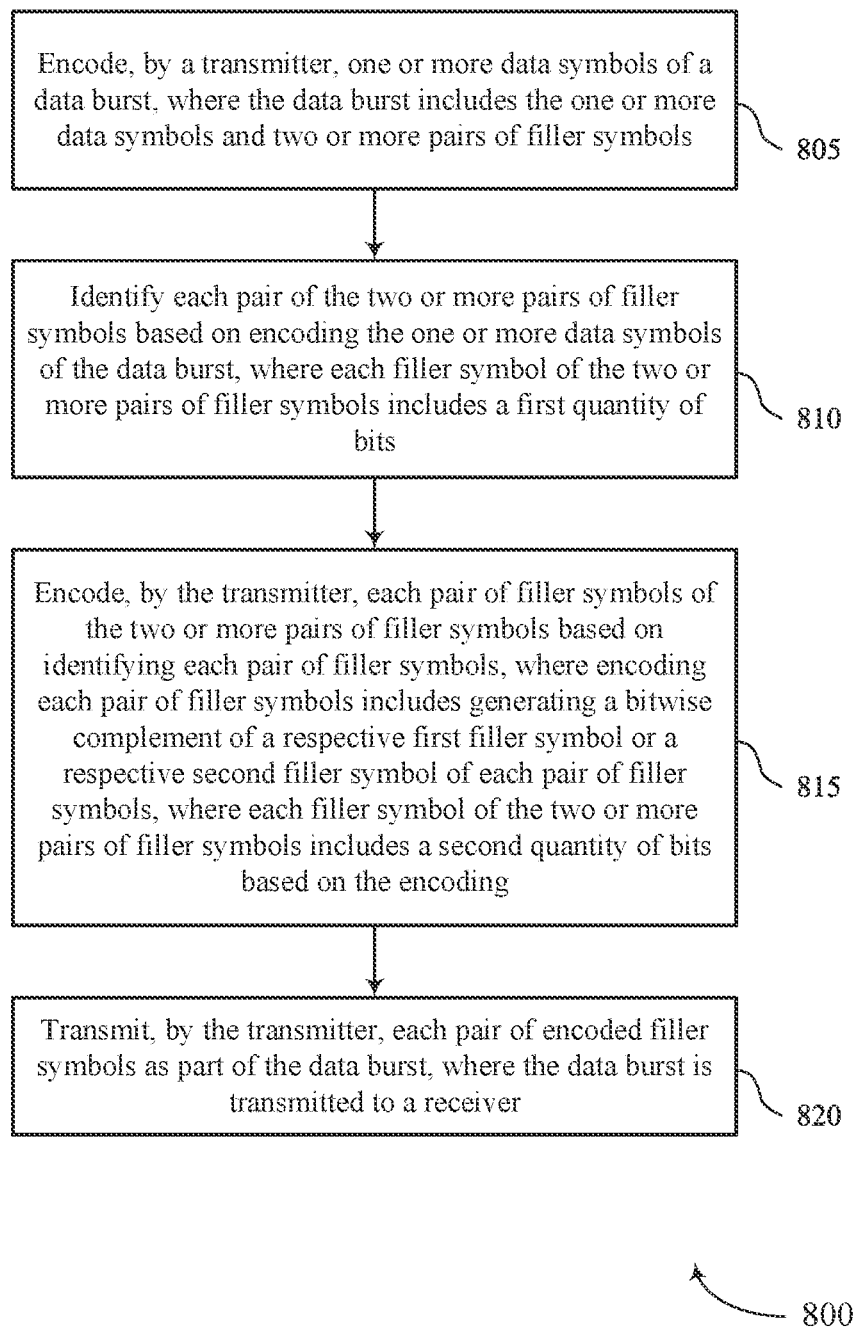

FIG. 8 illustrates a flowchart showing a method 800 that supports filler symbols for data bursts in accordance with examples as disclosed herein. The operations of method 800 may be implemented by a transmitter or its components as described herein. For example, the operations of method 800 may be performed by a transmitter as described with reference to FIGS. 1 through 4 and 6. In some examples, a transmitter may execute a set of instructions to control the functional elements of the device to perform the described functions. Additionally, or alternatively, the transmitter may perform aspects of the described functions using special-purpose hardware.

At 805, the method may include encoding, by a transmitter, one or more data symbols of a data burst, where the data burst includes the one or more data symbols and two or more pairs of filler symbols. The operations of 805 may be performed in accordance with examples as disclosed herein. In some examples, aspects of the operations of 805 may be performed by an encoding component 625 as described with reference to FIG. 6.

At 810, the method may include identifying each pair of the two or more pairs of filler symbols based on encoding the one or more data symbols of the data burst, where each filler symbol of the two or more pairs of filler symbols includes a first quantity of bits. The operations of 810 may be performed in accordance with examples as disclosed herein. In some examples, aspects of the operations of 810 may be performed by an identification component 630 as described with reference to FIG. 6.

At 815, the method may include encoding, by the transmitter, each pair of filler symbols of the two or more pairs of filler symbols based on identifying each pair of filler symbols, where encoding each pair of filler symbols includes generating a bitwise complement of a respective first filler symbol or a respective second filler symbol of each pair of filler symbols, where each filler symbol of the two or more pairs of filler symbols includes a second quantity of bits based on the encoding. The operations of 815 may be performed in accordance with examples as disclosed herein. In some examples, aspects of the operations of 815 may be performed by an encoding component 625 as described with reference to FIG. 6.

At 820, the method may include transmitting, by the transmitter, each pair of encoded filler symbols as part of the data burst, where the data burst is transmitted to a receiver. The operations of 820 may be performed in accordance with examples as disclosed herein. In some examples, aspects of the operations of 820 may be performed by a transmission component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for encoding, by a transmitter, one or more data symbols of a data burst, where the data burst includes the one or more data symbols and two or more pairs of filler symbols; identifying each pair of the two or more pairs of filler symbols based on encoding the one or more data symbols of the data burst, where each filler symbol of the two or more pairs of filler symbols includes a first quantity of bits; encoding, by the transmitter, each pair of filler symbols of the two or more pairs of filler symbols based on identifying each pair of filler symbols, where encoding each pair of filler symbols includes generating a bitwise complement of a respective first filler symbol or a respective second filler symbol of each pair of filler symbols, where each filler symbol of the two or more pairs of filler symbols includes a second quantity of bits based on the encoding; and transmitting, by the transmitter, each pair of encoded filler symbols as part of the data burst, where the data burst is transmitted to a receiver.

Aspect 12: The method, apparatus, or non-transitory computer-readable medium of aspect 11, where encoding each pair of filler symbols further includes operations, features, circuitry, logic, means, or instructions, or any combination thereof for mapping, randomly, a first filler symbol of each pair of filler symbols to a first sequence or a second sequence and mapping a second filler symbol of each pair of filler symbols to the first sequence or the second sequence, where the first filler symbol of each pair of filler symbols is mapped to a different sequence than the second filler symbol of each pair of filler symbols.

Aspect 13: The method, apparatus, or non-transitory computer-readable medium of any of aspects 11 through 12, further including operations, features, circuitry, logic, means, or instructions, or any combination thereof for receiving, by the transmitter, a first indication that the receiver is unavailable to receive one or more additional data symbols and refraining from transmitting one or more additional encoded data symbols based on receiving the first indication.

Aspect 14: The method, apparatus, or non-transitory computer-readable medium of any of aspects 11 through 13, further including operations, features, circuitry, logic, means, or instructions, or any combination thereof for receiving, by the transmitter, a second indication that the receiver is available to receive one or more additional data symbols and transmitting, by the transmitter, one or more additional encoded data symbols to the receiver based on receiving the second indication.

Aspect 15: The method, apparatus, or non-transitory computer-readable medium of any of aspects 11 through 14, where a first pair of the two or more pairs of filler symbols are adjacent to a last data symbol of the data burst.

Aspect 16: The method, apparatus, or non-transitory computer-readable medium of any of aspects 11 through 15, where transmitting each pair of encoded filler symbols as part of the data burst further includes operations, features, circuitry, logic, means, or instructions, or any combination thereof for transmitting each encoded pair of filler symbols of the two or more pairs of filler symbols sequentially.

Aspect 17: The method, apparatus, or non-transitory computer-readable medium of any of aspects 11 through 16, where the transmitter includes an M-PHY transmitter and the receiver includes an M-PHY receiver.

Aspect 18: The method, apparatus, or non-transitory computer-readable medium of any of aspects 11 through 17, where the second quantity of bits is greater than the first quantity of bits.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A. B. or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   transmitting, by a transmitter, a sequence of one or more data symbols of a data burst, wherein the sequence of one or more data symbols are transmitted to a receiver;
   identifying a last data symbol included in the sequence of one or more data symbols based on transmitting the sequence of one or more data symbols to the receiver;
   selecting a first filler symbol and a second filler symbol from a plurality of filler symbols, wherein the first filler symbol comprises a first type of control symbol and the second filler symbol comprises a second type of control symbol; and
   transmitting, by the transmitter, the first filler symbol and the second filler symbol based on selecting the first filler symbol and the second filler symbol from the plurality of filler symbols, wherein the first filler symbol and the second filler symbol are transmitted to the receiver within the data burst.

2. The method of claim 1, wherein selecting the first filler symbol and the second filler symbol comprises:
   selecting, randomly, the first filler symbol and the second filler symbol, wherein the first filler symbol and the second filler symbol are each associated with a respective probability for being selected.

3. The method of claim 1, wherein a periodicity of the data burst is based on a type of control symbols, a quantity of filler symbols of the plurality of filler symbols transmitted to the receiver, a periodicity that a type of control symbol is transmitted to the receiver, or a combination thereof.

4. The method of claim 1, wherein each filler symbol of the plurality of filler symbols comprises a respective control symbol of an Mobile Physical (M-PHY) symbol set.

5. The method of claim 1, wherein selecting the first filler symbol and the second filler symbol from a plurality of filler symbols is based on identifying the last data symbol included in the sequence of one or more data symbols.

6. The method of claim 1, further comprising:
inserting the first filler symbol and the second filler symbol into the data burst, wherein the first filler symbol and the second filler symbol are inserted after the sequence of one or more data symbols.

7. The method of claim 1, further comprising:
receiving, by the transmitter, a first indication that the receiver is unavailable to receive one or more additional data symbols based on transmitting the sequence of one or more data symbols, wherein transmitting the first filler symbol and the second filler symbol is based on receiving the first indication.

8. The method of claim 7, further comprising:
refraining from transmitting one or more additional data symbols to the receiver based on receiving the first indication, wherein identifying the last data symbol included in the sequence of one or more data symbols is based on refraining from transmitting the one or more additional data symbols to the receiver.

9. The method of claim 1, further comprising:
receiving, by the transmitter, a second indication that the receiver is available to receive one or more additional data symbols based on transmitting the first filler symbol and the second filler symbol; and
transmitting, by the transmitter, one or more additional data symbols to the receiver based on receiving the second indication.

10. The method of claim 1, wherein the transmitter comprises an M-PHY transmitter and the receiver comprises an Mobile Physical (M-PHY) receiver.

11. A non-transitory computer-readable medium storing code comprising instructions, which when executed by a processor of an electronic device, cause the electronic device to:
transmit a sequence of one or more data symbols of a data burst, wherein the sequence of one or more data symbols are transmitted to a receiver;
identify a last data symbol included in the sequence of one or more data symbols based on transmitting the sequence of one or more data symbols to the receiver;
select a first filler symbol and a second filler symbol from a plurality of filler symbols, wherein the first filler symbol comprises a first type of control symbol and the second filler symbol comprises a second type of control symbol; and
transmit the first filler symbol and the second filler symbol based on selecting the first filler symbol and the second filler symbol from the plurality of filler symbols, wherein the first filler symbol and the second filler symbol are transmitted to the receiver within the data burst.

12. The non-transitory computer-readable medium of claim 11, wherein the instructions, when executed by the processor of the electronic device, further cause the electronic device to:
select, randomly, the first filler symbol and the second filler symbol, wherein the first filler symbol and the second filler symbol are each associated with a respective probability for being selected.

13. A system, comprising:
one or more memory devices; and
processing circuitry coupled with the one or more memory devices and configured to cause the system to:
transmit, by a transmitter, a sequence of one or more data symbols of a data burst, wherein the sequence of one or more data symbols are transmitted to a receiver;
identify a last data symbol included in the sequence of one or more data symbols based on transmitting the sequence of one or more data symbols to the receiver;
select a first filler symbol and a second filler symbol from a plurality of filler symbols, wherein the first filler symbol comprises a first type of control symbol and the second filler symbol comprises a second type of control symbol; and
transmit, by the transmitter, the first filler symbol and the second filler symbol based on selecting the first filler symbol and the second filler symbol from the plurality of filler symbols, wherein the first filler symbol and the second filler symbol are transmitted to the receiver within the data burst.

14. The system of claim 13 wherein, to select the first filler symbol and the second filler symbol, the processing circuitry is further configured to cause the system to:
select, randomly, the first filler symbol and the second filler symbol, wherein the first filler symbol and the second filler symbol are each associated with a respective probability for being selected.

15. The system of claim 13, wherein a periodicity of the data burst is based on a type of control symbols, a quantity of filler symbols of the plurality of filler symbols transmitted to the receiver, a periodicity that a type of control symbol is transmitted to the receiver, or a combination thereof.

16. The system of claim 13, wherein each filler symbol of the plurality of filler symbols comprises a respective control symbol of an Mobile Physical (M-PHY) symbol set.

17. The system of claim 13, wherein the processing circuitry is configured to cause the system to select the first filler symbol and the second filler symbol from a plurality of filler symbols is based on identifying the last data symbol included in the sequence of one or more data symbols.

18. The system of claim 13, wherein the processing circuitry is further configured to cause the system to:
inserting the first filler symbol and the second filler symbol into the data burst, wherein the first filler symbol and the second filler symbol are inserted after the sequence of one or more data symbols.

19. The system of claim 13, wherein the processing circuitry is further configured to cause the system to:
receiving, by the transmitter, a first indication that the receiver is unavailable to receive one or more additional data symbols based on transmitting the sequence of one or more data symbols, wherein transmitting the first filler symbol and the second filler symbol is based on receiving the first indication.

20. The system of claim 19, wherein the processing circuitry is further configured to cause the system to:
refraining from transmitting one or more additional data symbols to the receiver based on receiving the first indication, wherein identifying the last data symbol included in the sequence of one or more data symbols is based on refraining from transmitting the one or more additional data symbols to the receiver.

* * * * *